United States Patent
Claessens et al.

(10) Patent No.: US 10,169,030 B1
(45) Date of Patent: Jan. 1, 2019

(54) REFRESHING A SOFTWARE COMPONENT WITHOUT INTERRUPTION

(71) Applicant: International Business Machines Corporation, Armonk, NY (US)

(72) Inventors: Ivo Claessens, Limburg (NL); Roy Janssen, Annendaal (NL); Ramon L. H. Pisters, Weert (NL); Frank Van Ham, Geldrop (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/703,218

(22) Filed: Sep. 13, 2017

(51) Int. Cl.
G06F 9/44 (2018.01)
G06F 8/656 (2018.01)
G06F 9/48 (2006.01)

(52) U.S. Cl.
CPC ............ G06F 8/656 (2018.02); G06F 9/4843 (2013.01)

(58) Field of Classification Search
CPC .................................................... G06F 9/4843
USPC ......................................................... 717/168
See application file for complete search history.

(56) References Cited

U.S. PATENT DOCUMENTS

| 7,000,228 | B2 | 2/2006 | Mortazavi | |
|---|---|---|---|---|
| RE39,837 | E * | 9/2007 | Marisetty | G06F 1/3203 713/324 |
| 7,360,208 | B2 | 4/2008 | Joshi et al. | |
| 7,818,736 | B2 | 10/2010 | Appavoo et al. | |
| 9,208,113 | B2 * | 12/2015 | Kumar | G06F 9/4418 |
| 9,235,406 | B2 | 1/2016 | Sen et al. | |
| 9,645,809 | B2 | 5/2017 | Cohen et al. | |
| 2002/0188933 | A1 | 12/2002 | Lee et al. | |
| 2006/0236027 | A1 * | 10/2006 | Jain | G11C 7/04 711/106 |
| 2011/0246713 | A1 * | 10/2011 | Bains | G11C 7/22 711/106 |

FOREIGN PATENT DOCUMENTS

| EP | 1879108 A1 | 1/2008 |
|---|---|---|
| EP | 2444895 A1 | 4/2012 |
| WO | 2013002629 A9 | 1/2013 |

OTHER PUBLICATIONS

Baumann, Improving Operating System Availability With Dynamic Update, https://www.microsoft.com/en-us/research/wp-content/uploads/2016/02/Baumann_ADKW_04.pdf, Proc. 1st Workshop on Operating System and Architectural Support for the On-Demand IT Infrastructure (OASIS), Oct. 2004, 7 pages.

* cited by examiner

*Primary Examiner* — John Q Chavis
(74) *Attorney, Agent, or Firm* — Robert Bunker; Edell, Shapiro & Finnan, LLC

(57) ABSTRACT

A method, system and computer program product are provided for refreshing a software component without interruption. The method includes detecting when a current instance of the software component is inactive and activating a refresh process of the software component in parallel to the current instance, including starting a new instance of the software component. The method further includes monitoring a state of the current instance and, when the current instance ceases to be inactive, canceling the refresh process. The method includes determining that the refresh process is complete and switching from the current instance to the new instance of the software component.

20 Claims, 7 Drawing Sheets

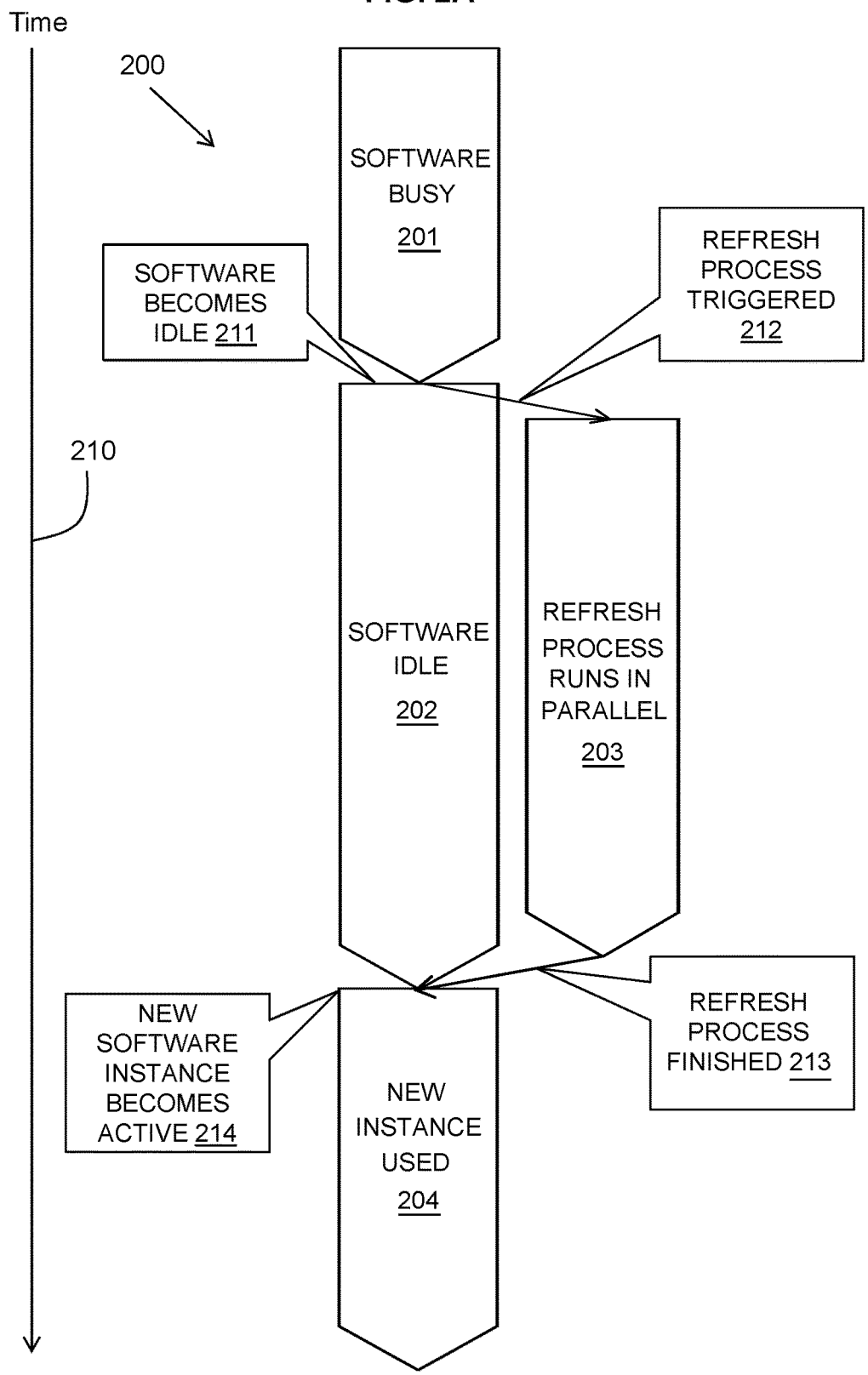

REFRESHING A SOFTWARE COMPONENT WITHOUT INTERRUPTION

BACKGROUND

Present invention embodiments relate to refreshing software components, and more specifically, to refreshing a software component without interruption to the running of the software component.

It is important to be able to use software components, including software components in the form of services, applications, as well as operating systems, without interruption. However, with ever more complex software this is increasingly challenging.

In order to run software components in a problem-free fashion, the software components require refreshing. Refreshing software components may be needed in order to, for example, upgrade or adjust the software component, fix problems, free up resources, or alter its configuration. These refreshes may be disruptive since the software component may be unavailable or paused while the refreshes are carried out. Any such refresh is especially important in a cloud environment where systems need to be available and run without interruption, but the same can apply to an operating system running, for example, on a laptop.

Approaches to refresh during idle time exist; however, they are still based on locking resources, requiring multiple machines or processor units, and once started will lead to unavailability of resources.

SUMMARY

According to an aspect of a present invention embodiment, there is provided a computer-implemented method for refreshing a software component without interruption, comprising: detecting when a current instance of the software component is inactive; activating a refresh process of the software component in parallel to the current instance, including starting a new instance of the software component; monitoring a state of the current instance and, when the current instance ceases to be inactive, canceling the refresh process; determining that the refresh process is complete; and switching from the current instance to the new instance of the software component.

According to another aspect of a present invention embodiment, there is provided a system for refreshing a software component without interruption, comprising: a processor and a memory configured to provide computer program instructions to the processor to execute components including: an idle detecting component for detecting when a current instance of the software component is inactive; a refresh activation component for activating a refresh process of the software component in parallel to the current instance, including starting a new instance of the software component; an idle monitoring component for monitoring a state of the current instance and, when the current instance ceases to be inactive, canceling the refresh process; a complete component for determining that the refresh process is complete; and a switching component for switching from the current instance to the new instance of the software component.

According to a further aspect of a present invention embodiment, there is provided a computer program product for refreshing a software component without interruption, the computer program product comprising a computer readable storage medium having program instructions embodied therewith, the program instructions executable by a processor to cause the processor to: detect when a current instance of the software component is inactive; activate a refresh process of the software component in parallel to the current instance, including starting a new instance of the software component; monitor a state of the current instance and, when the current instance ceases to be inactive, canceling the refresh process; determine that the refresh process is complete; and switch from the current instance to the new instance of the software component.

BRIEF DESCRIPTION OF THE DRAWINGS

The subject matter regarded as one or more embodiments of the invention is particularly pointed out and distinctly claimed in the concluding portion of the specification. The embodiments of the present invention, both as to organization and method of operation, together with features and advantages thereof, may best be understood by reference to the following detailed description when read with the accompanying drawings.

Preferred embodiments of the present invention will now be described, by way of example only, with reference to the following drawings in which:

FIGS. 2A and 2B are schematic diagrams of example aspects of a method in accordance with an embodiment of the present invention;

Figure 1:
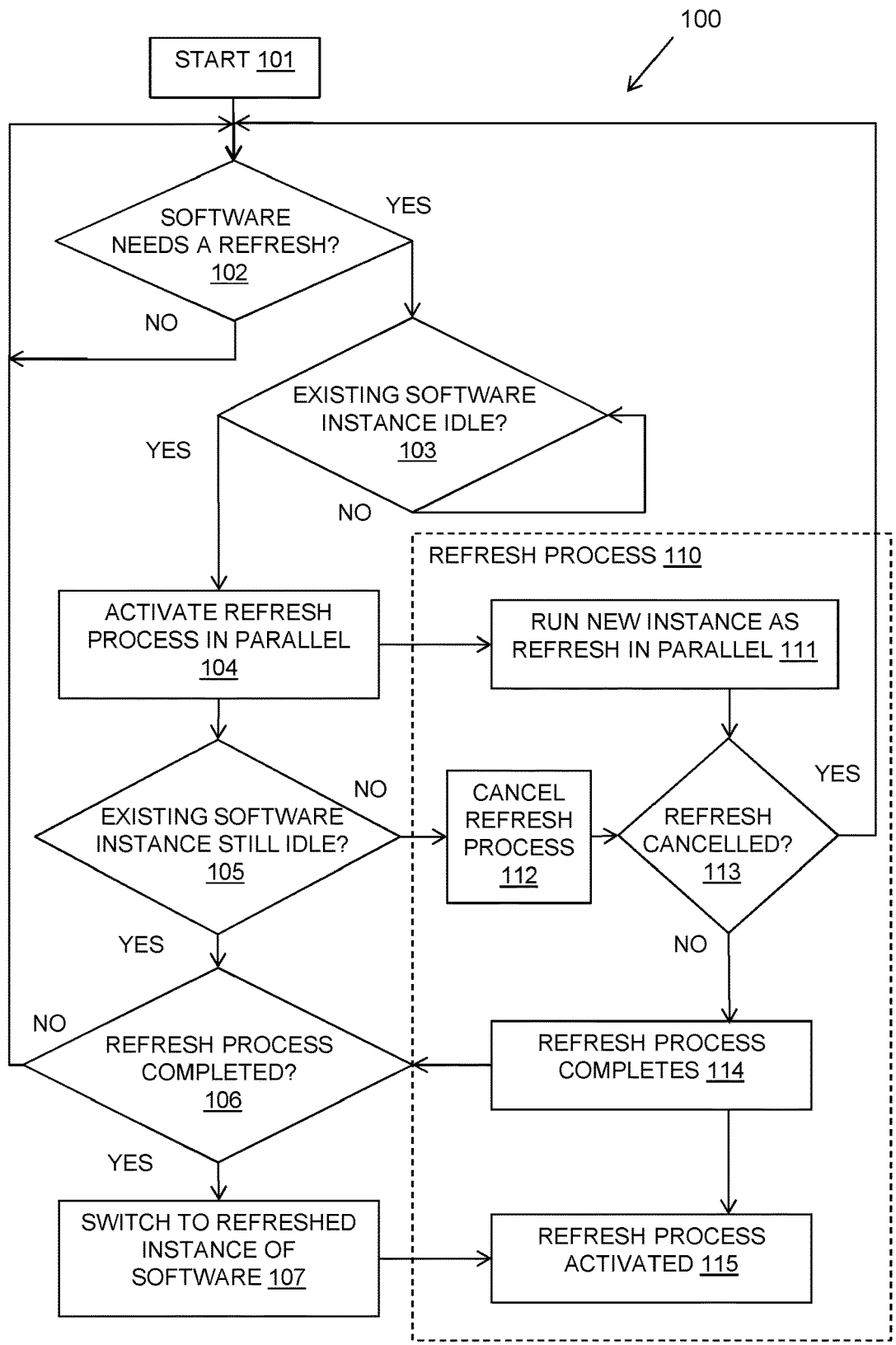
FIG. 1 is a flow diagram of an example method in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method, system, and computer program product are provided enabling refreshing of a software component without any interruption to a user of the software component. A software component may include a software application, service, or operating system, which may be provided on a computer, server, cloud-based system, or provided in any other environment.

A software component may be refreshed by being restarted, reconfigured, having a software upgrade, or any other change made to it. Any of these operations may be referred to as a "refresh" in this description.

The method detects that the software component is idle, which means that a user or any one of multiple users is not actively using the software component and the software component is not carrying out any processing that cannot be interrupted. This detection may be used as a trigger to attempt the refresh, by starting the refresh process.

The refresh process runs in parallel with the currently running instance of the software component, upgrades or otherwise changes the software component, and starts a new instance of the software component. If the software component is idle until the refresh process has finished, then the new instance may be made active, replacing the old instance. If the software component stops being idle, the refresh process may be canceled and the new instance may be simply dropped.

The method allows scenarios such as: restarting an operating system (OS) during a lunch break, or upgrading a service while all its users are asleep. When users come back, they will not have to wait for the refresh and may not even be aware of it. If they come back earlier, then they will not be aware of the attempted refresh that has aborted, which means that the overall refresh process is invisible to the users.

As this method can only attempt to refresh the software, additional measures may be required for its use. For example, logic or rules may be applied to prevent triggering the refresh too often, and other strategies may be used to make sure the refresh happens when a certain amount of time has passed. These additional strategies may be included for a more optimal implementation.

In the described method, idle time is used to refresh the software component, but it is not required to lock any resources or require multiple machines or physical processor units in order to enable the uninterrupted availability of the software component and to make refreshes invisible. In other words, a user that comes back after his lunch break will have his operating system on his laptop restarted, or a cloud service could be restarted while all users are asleep overnight. However, if a user were to come back early, before the restart is completed, the user will be able to just continue without the refresh having been applied.

The described method adequately detects that the software component is idle. A software component may be idle, when the current user or users are not actively working on the software component and the software component is not running tasks not requiring user input. For example, this may be when no requests from any users (or clients) are currently running, or the current user is currently not using any of the input devices that are part of an operating system. For software applications that cannot detect this, or where idle time is virtually non-existent in its normal operation, the method is not applicable. However, in situations where idle time is somewhat frequent it may be very valuable.

The method assumes that the software component is able to be (re)-instantiated next to the current instance that is already running. This means that a new instance can temporarily exist next to the current one.

Referring to FIG. 1, a flow diagram 100 shows an example embodiment of the described method applied to a software component. The method may be carried out by a refresh component as described further with reference to FIG. 3. The refresh component may run on the same system as the software component or may run remotely.

The method may start at flow 101 in order to refresh a selected software component. It may be detected at flow 102 that the software of the software component needs to be refreshed. The refresh component may detect that a refresh is required by using logic comprising rules that may include the following, as examples:
A new version is available;
The software has run for a period of x hours or days; and/or
The memory usage of the software is higher than a certain threshold.

If a refresh is not currently needed, the method may continue checking at flow 102 if a refresh is needed, for example at given time intervals. After the need for a refresh has been detected, it may be detected at flow 103 that the software component is idle.

The refresh component may detect that the user or users of the software component are not active and that the software component is not doing background work. This, for example, may be determined due to no input devices being used, or no requests are being processed or sent. Some background processing may be freely stopped in which case the software component may still be considered to be idle.

At this stage, additional logic may be applied to determine when to trigger the refresh process 110 and may include rules such as:
The user(s) have to be idle for at least x minutes;
The power connector needs to be plugged in; and/or
The current time is between a pre-defined range (e.g., 2 am-6 am).

After an idle state has been detected at flow 103 and any logic has been applied, the refresh process 110 may be activated at flow 104 in parallel with the current software component instance.

The refresh process 110 is run in parallel, which means the software the user has been using stays active, albeit idle. The refresh process 110 upgrades or otherwise changes the software component as required by the refresh and a new instance of the software is started at flow 111 in parallel, based on a newer version of such software or newer configurations. The refresh process 110 aims to continue until the new software instance completes by being completely installed at flow 114 and started and is ready to take over.

A new instance may be created in the background and how this is implemented depends on the specific situation. Generally, this may involve starting the software component again with the refreshed software and refreshed settings in a new process or thread. It may run the same, albeit refreshed, software again in a new memory space. Software components may be adjusted to be suitable for this dual-instance processing.

If the software is stateless, then running a new instance in a new process is possible by default. If the software has state, then the state (or part thereof that is deemed useful) will need to be able to get persisted and made available to the new instance of the software.

Typically when software is idle, there is less state that may need to be preserved and carried forward to the new software instance. The part of the state that does need to be persisted may already be persisted automatically to allow fail-over.

While the refresh process runs, the active instance needs to remain idle and therefore the idle state is monitored. At predetermined intervals or continuously, the method may check at flow 105 that the existing software instance is still idle. If it is detected that the existing software is active, the refresh process 110 is canceled at flow 112.

If the idle situation stops before the refresh process 110 is completed, the attempt at the refresh process fails and the process is simply canceled. This means that the refresh instance is simply dropped and all resources attached to it are released. This can normally be done almost instantly. In some embodiments, the refresh processing may be paused and continued again when the software is again idle. However, this is only suitable if the refresh process is able to keep using memory and disk space for the paused refresh process.

The refresh process 110 may, at predetermined intervals or continuously, check at flow 113 if an instruction has been received that the refresh process is to be canceled at flow 112. If so, the refresh process 110 is aborted and the method may loop to determine at flow 102 if the software component needs a refresh.

In an alterative embodiment, the method may loop to determine when the software component is again idle at flow 103. However, if the software component is not idle for a long time, there may be new refresh requirements that have arisen during the non-idle time.

If the existing software instance stays idle and the refresh process proceeds to completion at flow 114, an indication may be provided to the refresh component that enables it to determine at flow 106 that the refresh process has completed. There may be a timeout or detection of a refresh failure, in which case the method may loop to determine at flow 102 if the software still needs a refresh.

Once the refresh process has completed at flow 114, the new software instance may be used. The method may switch at flow 107 to the new software instance and the refresh process 110 may activate at flow 115 its newly refreshed instance. The new instance may be actively used and the old instance may be dropped. Part of the transitioning may be the transfer of the state of the software, so that the software is not stateless.

To illustrate the timeline of the method, two main scenarios are illustrated with reference to FIGS. 2A and 2B that show schematic diagrams of aspects of the method.

FIG. 2A shows a schematic diagram 200 against a timeline 210 of an example scenario in which the refresh process completes.

The software component is busy at flow 201 and then, at a given time 211, becomes idle at flow 202. The refresh process is triggered at time 212 when the software becomes idle and the refresh process runs in parallel at flow 203 with the idle software at flow 202.

The software is idle at flow 202 long enough for the refresh process that runs in parallel at flow 203 to update the software and start a new instance. The refresh process finishes at time 213 and the new software instance becomes active at time 214. Once this happens, the new instance is used at flow 204 and the old instance is dropped.

Figure 2B:
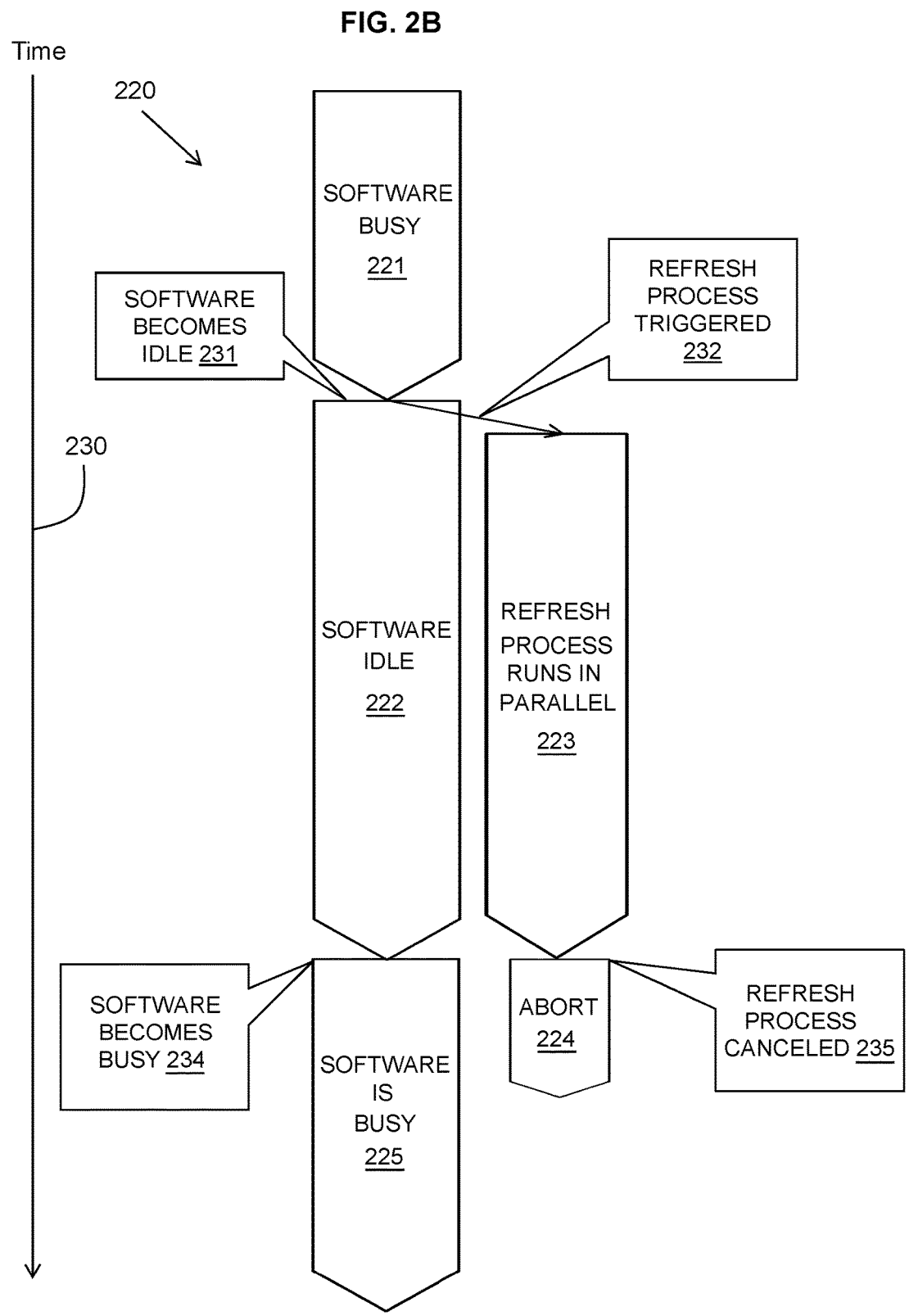

FIG. 2B shows a schematic diagram 220 against a timeline 230 of an example scenario in which the refresh process does not complete.

The software component is busy at flow 221 and then, at a given time 231, becomes idle at flow 222. The refresh process is triggered at time 232 when the software becomes idle and the refresh process runs in parallel at flow 223 with the idle software at flow 222.

The software becomes busy again at time 234 before the parallel refresh process has completed. When this happens, the refresh process is canceled at time 235 and aborted at flow 224. The existing instance of the software simply resumes operation again at flow 225. The user will not be aware that the parallel refresh process at flow 223 has run and aborted at flow 224.

The refresh process may be canceled and discarded if the software component being refreshed is not idle long enough. This means that multiple attempts might be required, or potentially the refresh may never complete this way. This does not make the method invalid as the benefit of the method is that the refresh is as non-interruptive as possible. The frequency as well as the start of the refresh can be controlled by logic to curb the number and frequency of the attempts. In addition, if the refresh has not succeeded for too long, alternative strategies may be used.

The running of the refresh process may be subject to additional logic. This logic may be applied in addition to the steps that determine whether a refresh is necessary and whether the software is idle. The logic may contain rules such as the following examples:

Only attempt a refresh once every hour;
Only attempt a refresh if the software has been idle for more than 5 minutes; and/or
Only attempt a refresh at certain times of the day.

The exact logic and rules are not part of the method and may vary for different implementations.

The method may be used in addition to other strategies to refresh software components. A number of strategies already exist and could be used in combination with this method.

There may be software components for which the described method is not applicable and there may be a testing method for establishing whether or not the method should be used for a particular software component. A test may include whether an idle time may not be possible to be determined or it virtually does not exist.

Another test may determine that upgrades need to happen at a fixed time and/or breaking changes are involved. A breaking change is a significant update of the software that, for example, starts using a new format to save its information that is no longer compatible with the old version. This means that something in the software's compatibility between versions is broken and, therefore, such changes need to be applied with great care. Such changes may have to be installed for all users in a coordinated fashion, or applied to more than one distinct piece of software so that interoperability is guaranteed after the refresh.

In situations where this method is applicable, it can be of benefit to users and administrators of the software and results in increased productivity and reduced downtime.

Figure 3:
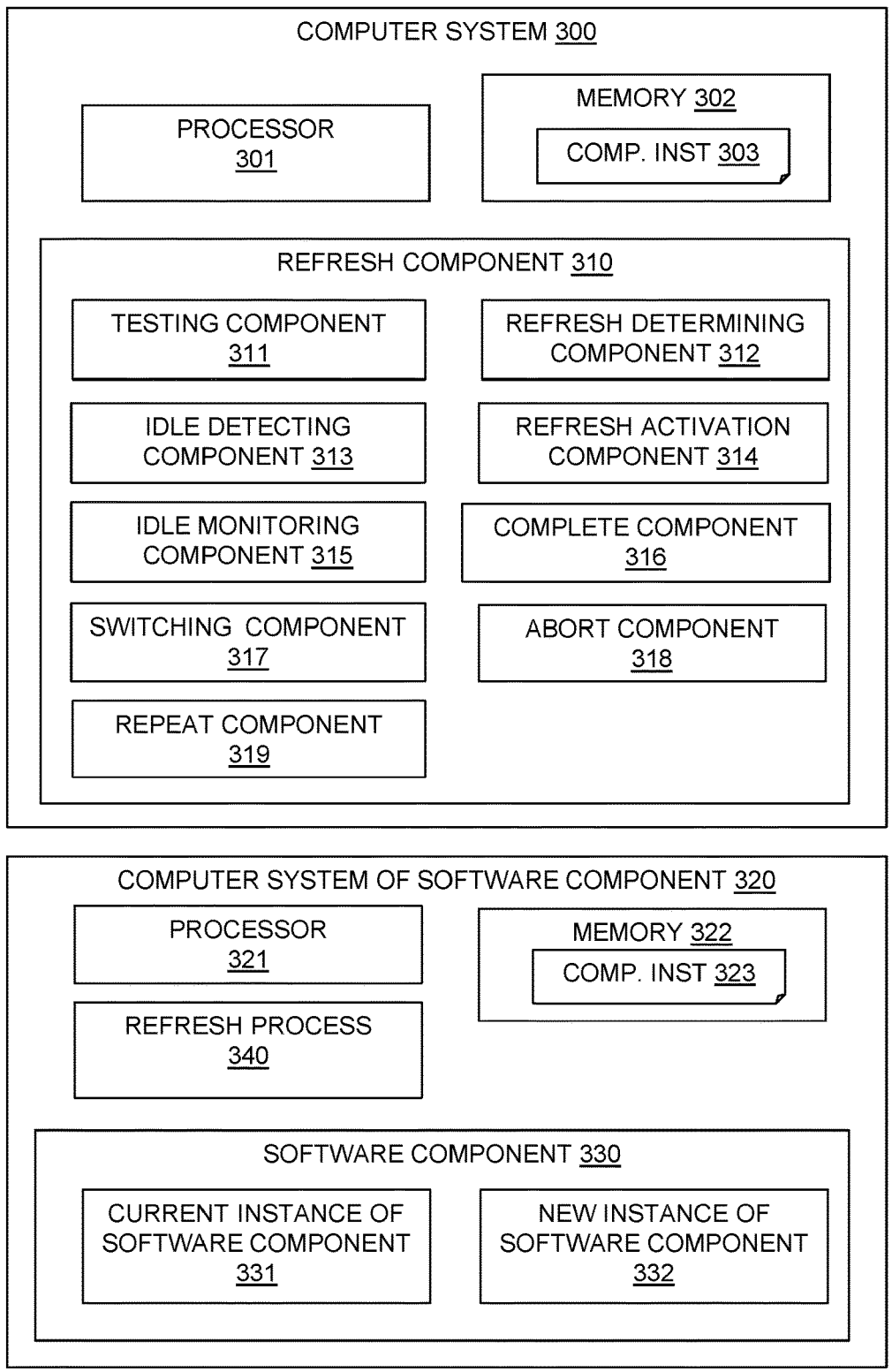
FIG. 3 is block diagram of an example system in accordance with an embodiment of the present invention.

Referring to FIG. 3, a block diagram 300 shows an example embodiment of a computer system 300 including a refresh component 310. A computer system 320 may also be provided on which a software component 330 to be refreshed may be provided and on which a refresh process 340 may be executed. The refresh process 340 may include a downloadable upgrade of the software component 330 or may be an online upgrade or other remotely provided upgrade.

The computer system 300 including the refresh component 310 may be the same computer system 320 that provides the software component 330 or may be a separate, remote computer system. For example, the refresh component 310 may be provided as a remote application or cloud service.

The computer systems 300, 320 may include at least one processor 301, 321, a hardware module, or a circuit for executing the functions of the described components which may be software units executing on the at least one processor. Multiple processors running parallel processing threads may be provided enabling parallel processing of some or all of the functions of the components. Memory 302, 322 may be configured to provide computer instructions 303, 323 to the at least one processor 301, 321 to carry out the functionality of the components.

The refresh component 310 may include a testing component 311 for testing the software component 330 to determine if it is suitable for refreshing using the functionality of the refresh component 310. The testing component 311 may determine if the software component 330 has suitable idle time and if the software component 330 is able to have a separate new instance created in parallel with a current instance of the software component 330.

The refresh component 310 may include a refresh determining component 312 for automatically determining that a software component requires refreshing. This may include rules defining when a refresh should be carried out.

The refresh component 310 may include an idle detecting component 313 for detecting when a current instance 331 of the software component is inactive. In one embodiment, the idle detecting component 313 may determine that no input devices are being used or that no requests are being processed or sent. The idle detecting component 313 may apply configured rules defining the level or duration of the inactivity.

The refresh component 310 may include a refresh activation component 314 for activating a refresh process 340 of the software component 330 in parallel to the current instance 331, including starting a new instance 332 of the software component. The software component 331 is re-instantiated in parallel with the current instance 331 so that there are temporarily two instances 331, 332 of the software component 330 existing. The new instance 332 may be a reconfigured or upgraded instance.

The refresh component 310 may include an idle monitoring component 315 for monitoring the state of the current instance 331 during the refresh process 340.

The refresh component 310 may include an abort component 318 for canceling the refresh process 340 in the event that the current instance 331 ceases to be inactive and a repeat component 319 for restarting the refreshing if the refresh process 340 is canceled. The repeat component 319 may determine if the refresh should be repeated according to configured rules defining refresh attempts.

The refresh component 310 may include a complete component 316 for determining that the refresh process 340 is complete and a switching component 317 for switching from the current instance 331 to the new instance 332 of the software component 330.

Figure 4:
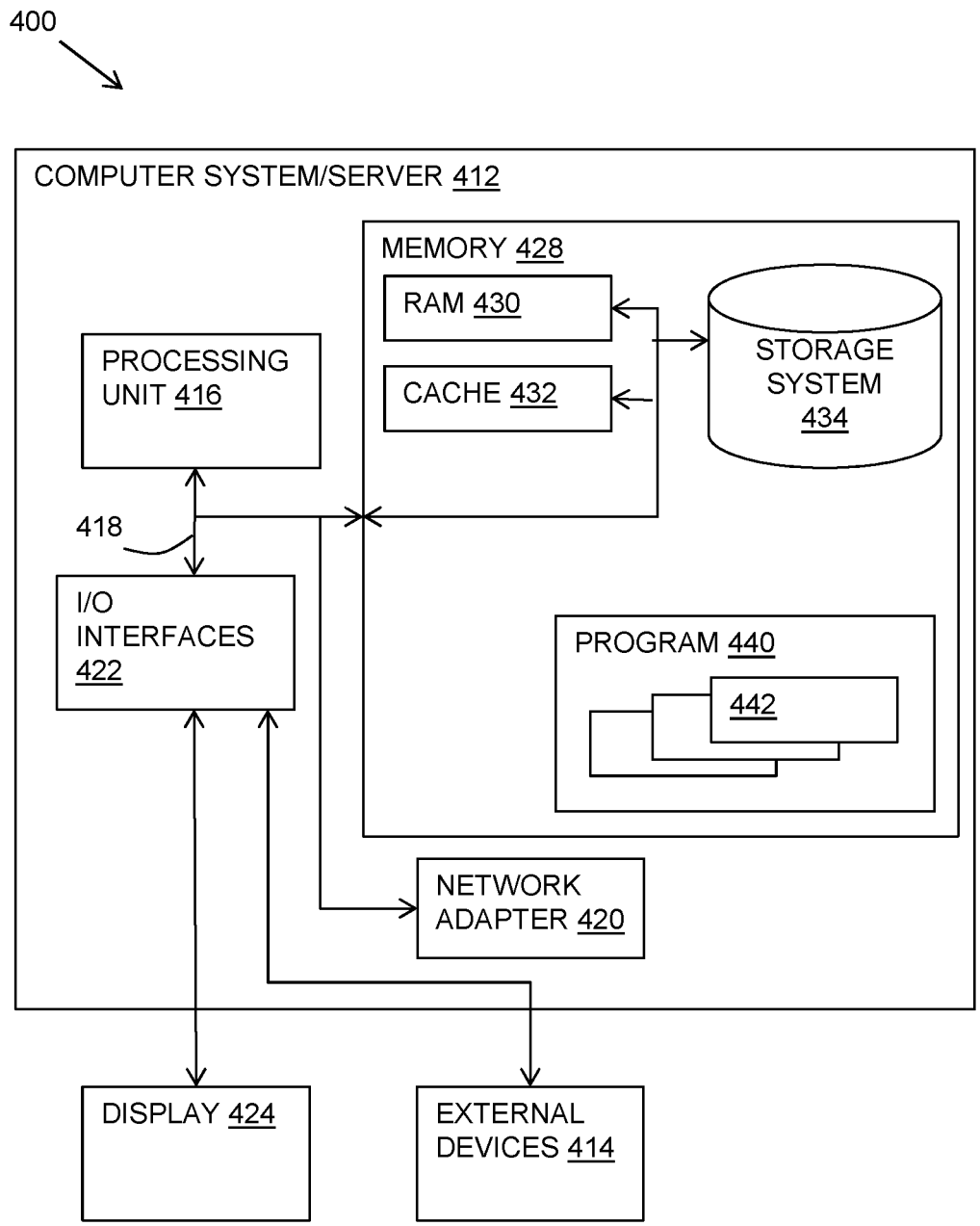
FIG. 4 is a block diagram of a computer system or cloud server in which an embodiment of the present invention may be implemented.

Referring now to FIG. 4, a schematic of an example of a system 400 of a present invention embodiment in the form of a computer system or server is shown.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
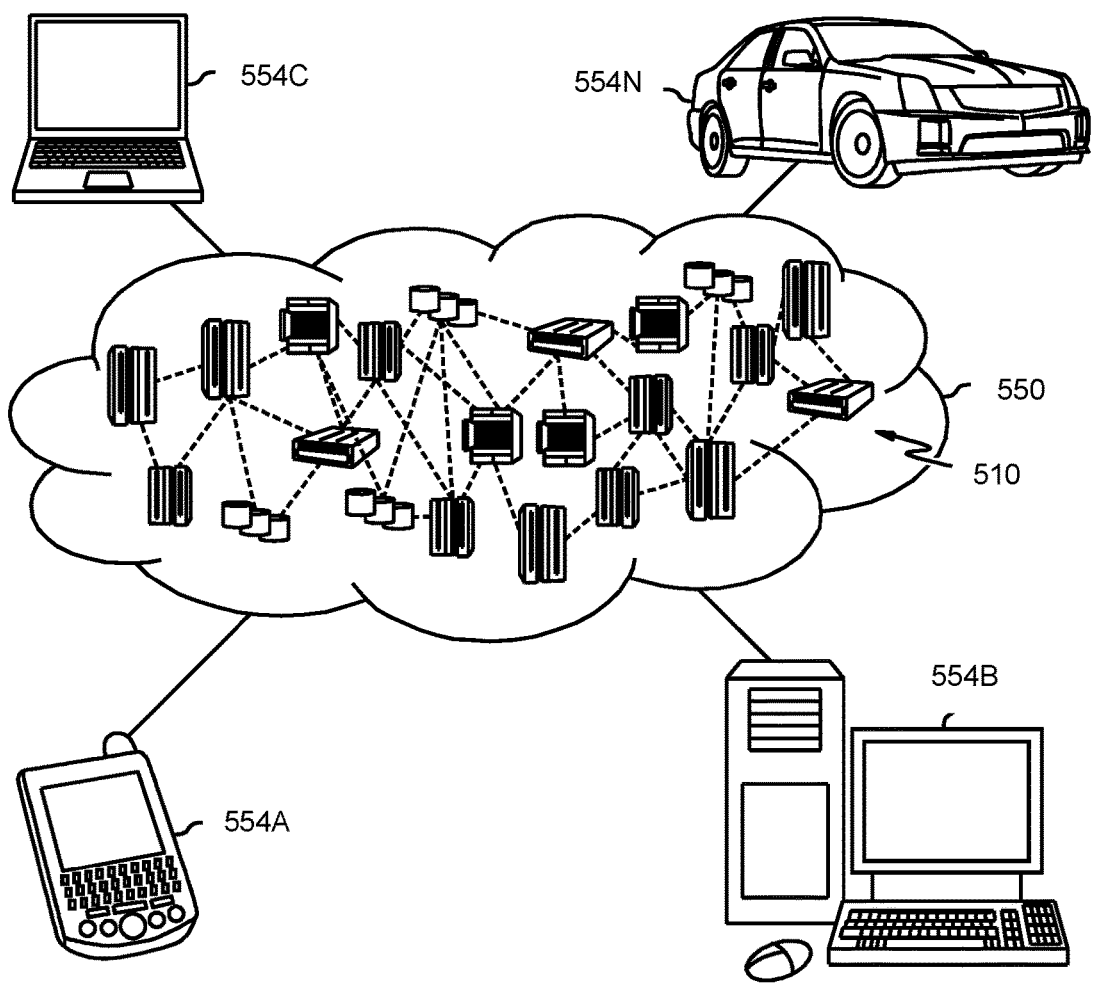
FIG. 5 is a schematic diagram of a cloud computing environment in which an embodiment of the present invention may be implemented.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
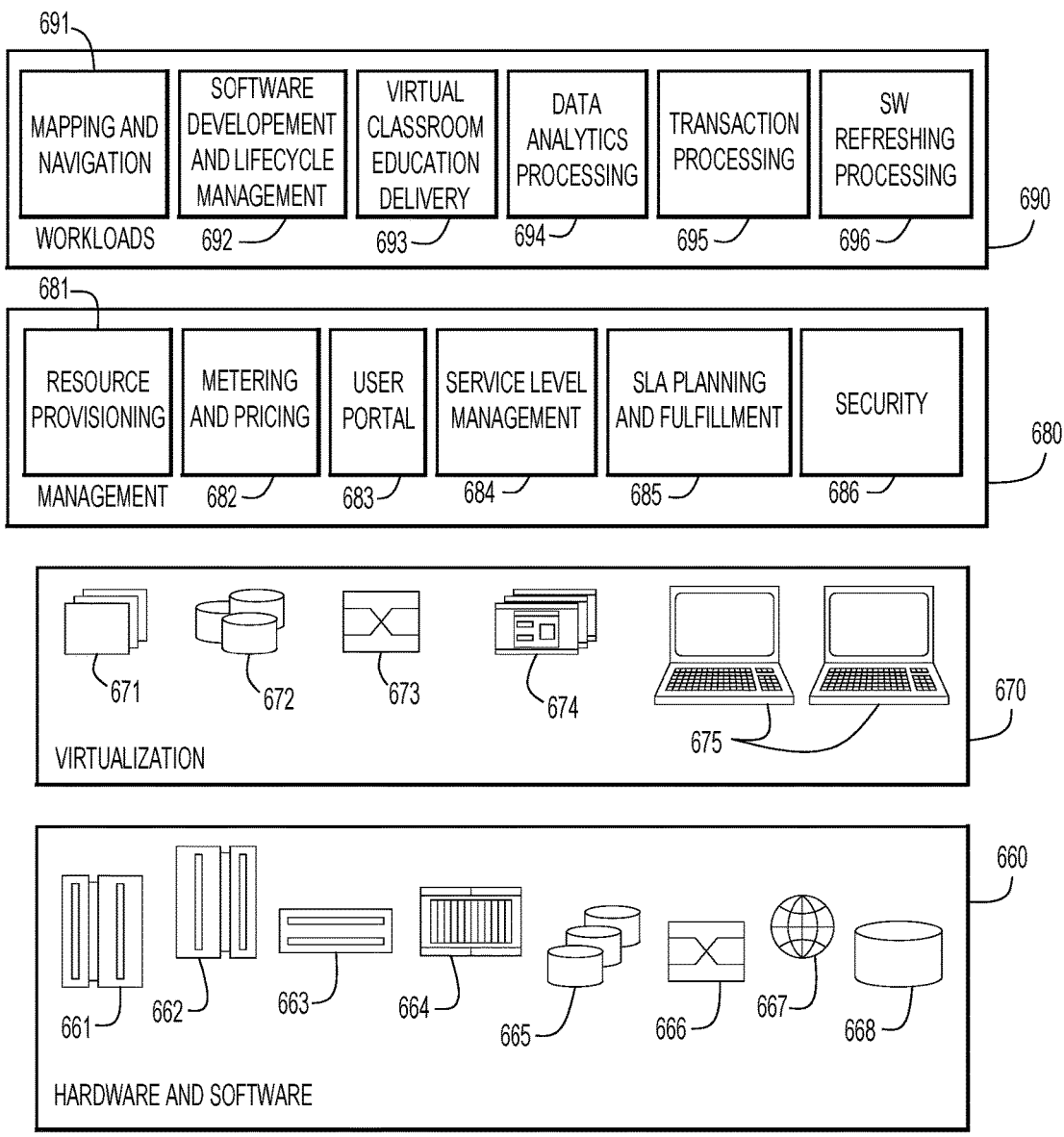
FIG. 6 is a diagram of abstraction model layers of a cloud computing environment in which an embodiment of the present invention may be implemented.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security 686 provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and software refreshing processing 696.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for refreshing a software component without interruption, comprising:
    detecting when a current instance of the software component is inactive;
    activating a refresh process of the software component in parallel to the current instance, including starting a new instance of the software component;
    monitoring a state of the current instance and, when the current instance ceases to be inactive, canceling the refresh process;
    determining that the refresh process is complete; and
    switching from the current instance to the new instance of the software component.

2. The method as claimed in claim 1, wherein the software component is re-instantiated in parallel with the current instance so that there are temporarily two instances of the software component existing, and wherein the new instance is a reconfigured or upgraded instance.

3. The method as claimed in claim 1, wherein switching from the current instance to the new instance of the software component includes transferring the state of the software component.

4. The method as claimed in claim 1, including starting the refreshing when it is automatically detected that the software component requires refreshing and, when the refresh process cancels, looping to detect when the software component requires an updated refresh.

5. The method as claimed in claim 1, wherein when the refresh process is canceled, repeating the refreshing according to configured rules defining a frequency of refresh attempts.

6. The method as claimed in claim 1, wherein detecting when a current instance of the software component is inactive includes determining that no input devices are being used and no requests are being processed or sent.

7. The method as claimed in claim 1, wherein detecting when a current instance of the software component is inactive includes determining that no background processes that are uninterruptible are running.

8. The method as claimed in claim 1, wherein detecting when a current instance of the software component is inactive includes applying configured rules defining inactivity.

9. The method as claimed in claim 1, further including testing the software component to determine when the software component is suitable for the refresh process, wherein the testing determines when the software component has idle time and when the software component is able to run a separate instance in parallel.

10. The method as claimed in claim 1, wherein the refresh process includes one or more from a group of: a restart process, a reconfiguration process, and an upgrade process.

11. A system for refreshing a software component without interruption, comprising:
    a processor and a memory configured to provide computer program instructions to the processor to execute components including:
        an idle detecting component for detecting when a current instance of the software component is inactive;
        a refresh activation component for activating a refresh process of the software component in parallel to the current instance, including starting a new instance of the software component;
        an idle monitoring component for monitoring a state of the current instance and, when the current instance ceases to be inactive, canceling the refresh process;
        a complete component for determining that the refresh process is complete; and
        a switching component for switching from the current instance to the new instance of the software component.

12. The system as claimed in claim 11, wherein the software component is re-instantiated in parallel with the current instance so that there are temporarily two instances of the software component existing, and wherein the new instance is a reconfigured or upgraded instance.

13. The system as claimed in claim 11, further including a refresh determining component for starting the refreshing when it is automatically determined that the software component requires refreshing.

14. The system as claimed in claim 11, further including a repeat component for repeating the refreshing when the refresh process is canceled according to configured rules defining a frequency of refresh attempts.

15. The system as claimed in claim 11, wherein the idle detecting component determines that no input devices are being used.

16. The system as claimed in claim 11, wherein the idle detecting component determines that no requests are being processed or sent.

17. The system as claimed in claim 11, wherein the idle detecting component applies configured rules defining inactivity.

18. The system as claimed in claim 11, further including a testing component for testing the software component to determine when the software component is suitable for the refresh process, wherein the testing determines when the software component has idle time and when the software component is able to run a separate instance in parallel.

19. The system as claimed in claim 11, wherein the refresh process includes one or more from a group of: a restart process, a reconfiguration process, and an upgrade process.

20. A computer program product for refreshing a software component without interruption, the computer program product comprising a computer readable storage medium having program instructions embodied therewith, the program instructions executable by a processor to cause the processor to:
- detect when a current instance of the software component is inactive;
- activate a refresh process of the software component in parallel to the current instance, including starting a new instance of the software component;
- monitor a state of the current instance and, when the current instance ceases to be inactive, canceling the refresh process;
- determine that the refresh process is complete; and
- switch from the current instance to the new instance of the software component.

\* \* \* \* \*